United States Patent [19]

Neil et al.

[11] Patent Number: 4,803,718
[45] Date of Patent: Feb. 7, 1989

[54] HOLD DETECTING AND CONTROL CIRCUIT FOR A KEY TELEPHONE SYSTEM

[75] Inventors: James E. Neil, Buffalo; Victor Demjanenko, North Tonawanda; Christopher R. Caile, Williamsville, all of N.Y.

[73] Assignee: Tree Technologies Corporation, Williamsville, N.Y.

[21] Appl. No.: 22,890

[22] Filed: Mar. 6, 1987

[51] Int. Cl.$^4$ .................. H04M 1/00; H04M 9/06
[52] U.S. Cl. ........................... 379/163; 379/164; 379/377; 379/393
[58] Field of Search ............ 379/156, 162, 163, 164, 379/158, 423, 377, 379, 381, 385, 393

[56] References Cited

U.S. PATENT DOCUMENTS

| | | | |
|---|---|---|---|
| 3,914,556 | 10/1975 | Frazee | 379/379 |
| 4,004,106 | 1/1977 | Yachabach | 379/423 |
| 4,011,413 | 3/1977 | Phillips | 379/393 |
| 4,132,860 | 1/1979 | Rasmussen | 179/99 |
| 4,133,985 | 1/1979 | Rasmussen et al. | 179/99 |
| 4,382,163 | 5/1983 | White | 379/164 |

Primary Examiner—Jin F. Ng
Assistant Examiner—Wing F. Chan
Attorney, Agent, or Firm—Robert P. Simpson; Michael L. Dunn

[57] ABSTRACT

A key telephone system for use with at least two telephone lines that extend between a central office and two or more telephone stations. Each station is capable of responding to a manually-actuated hold select switch by establishing a hold condition on one of the lines and by connecting a line terminating impedance across the line that is to be held. Each station is further capable of monitoring the state of each line, and indicating the state of each line, without applying any indicating signals to the telephone lines. Each station furthermore determines threshold voltages for on-hook, off-hook and hold line states and determines line state by comparison of line voltage with such threshold voltages.

65 Claims, 3 Drawing Sheets

HOLD DETECTING AND CONTROL CIRCUIT FOR A KEY TELEPHONE SYSTEM

BACKGROUND OF THE INVENTION

In general the present invention relates to telephone station equipment, and more particularly to multi-line telephone systems having no central control unit.

Telephone installations in which calls can be placed or received at any one of a number of telephone sets, and over any one of a number of available telephone lines, are well known and are called key telephone systems (KTS). Installations requiring five or more lines typically include a central control unit, which must be set up at a location remote from the telephone sets. It is generally not economical for businesses which require less than five lines to install and operate a key telephone system having a central control unit. One system which does not require a central control unit is disclosed by Rasmussen in U.S. Pat. Nos. 4,132,860 and 4,133,985.

An important feature of a key telephone system is the ability to place a telephone line on hold from any one of the telephone sets, and also to release the hold from any of the telephones within the system. The hold condition is achieved by connecting a line terminating impedance across the line that is to be held. This terminating impedance simulates an off-hook condition which causes the central office to maintain the connection with the remote telephone. In U.S. Pat. No. 4,132,860, Rasmussen teaches the application of a low frequency (0.5 Hz) square wave across the telephone line to indicate that the line is in a hold station. This fluctating signal, which is produced by a zener diode circuit, is transmitted to visual indicator lights at each remote telephone.

The hold control circuit of Rasmussen presents several disadvantages. First, the low frequency square wave which indicates a hold condition may also produce an audible periodic clicking sound which may be objectionable to the party on hold. Second, for proper operation on long (high resistance) subscriber loops, a telephone set must either provide a d.c. resistance of 330 ohms maximum, or maintain a minimum loop current of 26 mA for loop voltages above 8.58 volts. The preferred breakdown voltage for the two zener diodes in Rasmussen's circuit is 20 volts. Thus, a 48 volt system voltage (also called exchange battery voltage, regardless of actual EMF source) battery in a 1500 ohm subscriber loop would produce a d.c. loop current of 18.7 mA in the Rasmussen circuit, which is too low to ensure proper central office line supervision. Finally, telephone lines in the United States should generally be terminated in an a.c. impedance of 600 ohms. The a.c. impedance range is constrained by the allowable return loss in the voice band of 7 dB, which implies a minimum a.c. impedance of 230 ohms. The dynamic resistance of zener diode varies depending on manufacture, but values of $R_z=5$ ohms are typical. Thus, the circuit disclosed by Rasmussen would have a typical a.c. impedance of 10 ohms, which is unacceptably low, in that it would result in reflection of signals in the voice band.

SUMMARY OF THE INVENTION

The invention is intended for use in key telephone system having at least one telephone line that extends between a central office and two or more telephone stations. Each station is provided with a hold detecting and control circuit which is responsive to a manually-actuated hold select switch and provides for establishing a hold condition on one of the lines over which a telephonic connection has been established with the central office. Moreover, the hold circuit circuit comprises means for connecting a line terminating impedance across the line that is to be held, and for providing an indication that the line is in a hold state, without applying any indicating signals to the telephone line. The telephone system also comprises means for determining and monitoring the state (e.g., on-hook, off-hook or hold) of each individual line.

More particularly, the invention provides a method for accomplishing the above which comprises periodically detecting the on-hook line voltage, determining a representative stable on-hook line voltage using the periodically detected on-hook line voltages, and storing the value of the stable on-hook line voltage. The method includes comparing detected line voltages with a predetermied minimum line voltage for the on-hook condition and determining when the detected line voltage is below the predetermined minimum voltage so as to indicate that the line is in the off-hook state. Additionally, the method comprises periodically detecting the off-hook line voltage, determining a representative stable off-hook line voltage using the periodically detected off-hook line voltages, and storing the value of the stable off-hook line voltage. First and second transition threshold voltages are calculated for discrimination between off-hook, hold and on-hook states using the stored on-hook and off-hook voltages and known system constants and the line voltage is periodically detected and compared with the threshold voltages to detect the line state (i.e., on-hook, off-hook or hold).

A hold control method is also contemplated in accordance with the present invention which includes the hold detecting method steps previously described and further includes placing a telephone line in a hold state from an off-hook state by connecting an impedance across the line. Similarly, the method may include placing a line in an off-hook state by connecting a different impedance across the line. In both cases the impedance may be provided by a linear circuit element and is preferably constant. The hold control method may further include indicating the state of the line in response to the comparison of the line voltage with the first and second threshold voltages. The method may also include detecting transitions between off-hook and hold states in response to the comparison of the line voltage to the first threshold voltage and between the off-hook and hold or on-hook states in response to the comparison of the line voltage and second threshold voltage.

The invention further includes apparatus utilizing the above-described methods wherein means are provided for accomplishing the above-described method steps.

Accordingly, an overall object of the invention is to provide a novel key telephone system capable of being installed by the user at a relatively low cost.

A more particular object of the invention is to provide a hold detecting and control circuit for use in a key telephone system without a central control unit, which is capable of discriminating between off-hook, hold and on-hook states without applying a signal to the telephone line and without communication between the individual telephone sets. A related object is to provide a hold control circuit which provides a maximum d.c. resistance of 330 ohms to ensure proper central office supervision, and a minimum a.c. impedance of 230 ohms to prevent reflection of voice band signals.

A further object of the invention is to provide a hold detecting and control circuit for use in a key telephone system without a central control unit, which is suitable for use with a wide range of exchange battery voltages, particularly with exchange battery voltages as low as 24 volts. Such low exchange battey voltages are used in some private branch exchanges, and are also used in many foreign telephone systems, particularly in Europe. Thus, the present invention is suitable for use in both the United States and several foreign countries.

These and further features, objects and advantages of the invention will become apparent to those skilled in the art from the following detailed description and appended drawings.

DETAILED DESCRIPTION OF THE INVENTION

Figure 1:
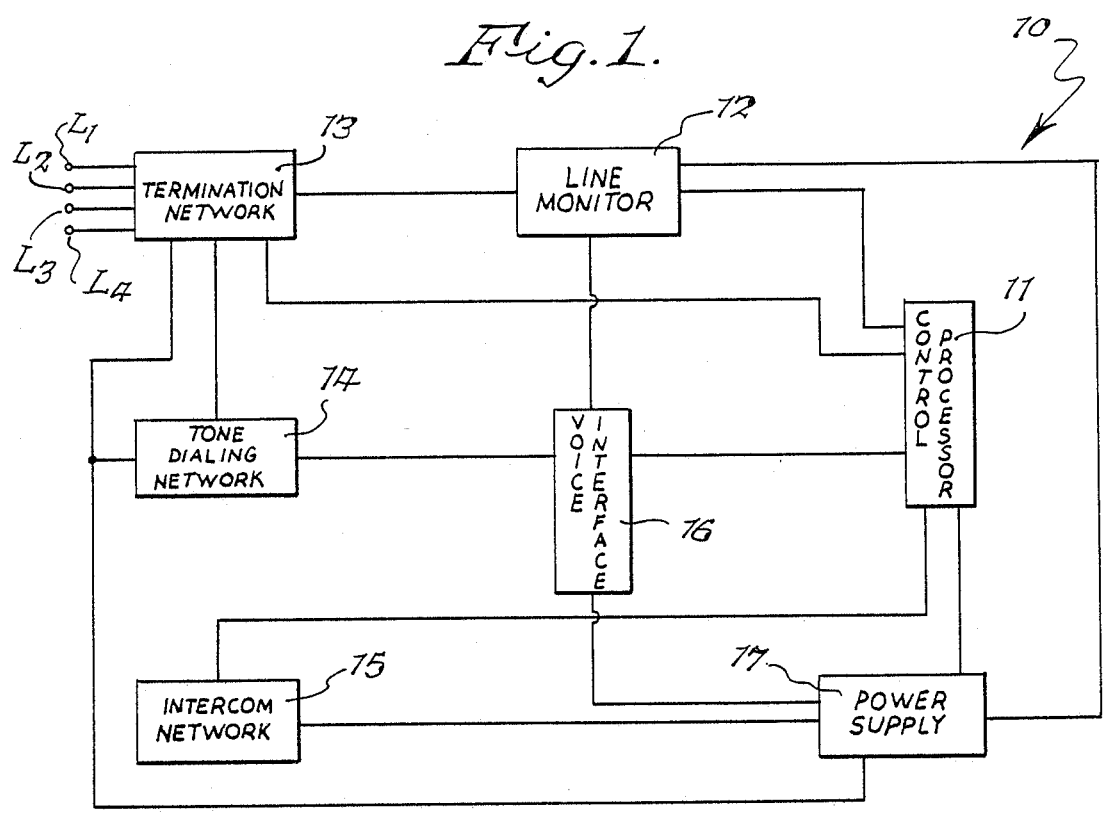
FIG. 1 is a generalized block diagram of the key telephone system of the invention.

In accordance with the present invention, the means for periodically detecting the on-hook line voltage may be any suitable means. The line, for example, may be periodically connected to a detecting means in response to a solid state switch responsive to an oscillator. The value of the sampled voltage may then be determined by means well known in the art and the value stored in analog or digital forms. In accordance with one preferred embodiment of the invention, means is provided to amplify the differential on-hook lie voltage, to convert it to a proportional ground-referenced analog voltage signal, to convert the analog voltage signal to digital form and to initiate the analog-to-digital conversion at specified points in time. The differential on-hook line voltage amplifier means may be any amplifier operatively arranged to amplify the differential line voltage. In a preferred embodiment, the differential amplifier is in the form of an operational amplifier circuit. Also, the conversion of the analog line voltage to digital form may be accomplished by any means known to those skilled in the art; in a preferred embodiment the conversion is accomplished by an analog-to-digital integrated circuit. Similarly, any timing circuit may be used to initiate the sampling and analog-to-digital conversion at specific points in time, whereas in a preferred embodiment this timing is provided by a microcomputer.

The sampled line voltage is usually stored so that it can be averaged with previous samples. The averaging can occur continuously (i.e., after each sample and storing the resulting average for subsequent averaging with the next sample), or a number of values may be stored and then averaged together. In accordance with a preferred embodiment of the present invention, a microcomputer is used to continuously sample and average the on-hook line voltage.

The means for storing the value of the average (stable) on-hook line voltage again may be any means known to those skilled in the art. In a preferred embodiment the stable on-hook line voltage is in digital form and is stored in computer memory, desirably in the internal memory of a microcomputer.

The means for comparing detected line voltage with a predetermined voltage for the on-hook state and determining when the detected line voltage is below the predetermined voltage for a predetermined time period which indicates the off-hook state again may comprise any such comparator means known to those skilled in the art, such as a bi-stable device which acts as a switch when a voltage falls below the predetermined voltage. In accordance with a preferred embodiment described herein a microcomputer is used to compare a digitized detected line voltage with a digitized predetermined voltage for the on-hook state and for determining when the detected line voltage is below the predetermined voltage for a predetermined time period to indicate an off-hook state. The predetermined time period may be a set number of cycles of the computer clock.

The means for periodically detecting the off-hook line voltage may be a means similar to the means for periodically detecting the on-hook line voltage as previously described. Again in accordance with a preferred embodiment of the invention, such means may comprise a means for amplifying the differential off-hook line voltage; means for converting the differential voltage to a proportional ground referenced analog voltage signal; means for converting the analog voltage signal to digital form and means for initiating the analog to digital conversion at specified points in time.

Again, the means for determining a representative stable off-hook line voltage may comprise means or circuitry similar to that previously described with respect to the on-hook line voltage. In a preferred embodiment, a microcomputer is used to continuously sample and average the digitized off-hook line voltages. The means for storing the representative stable off-hook line voltaage desirably comprises a computer memory which may be the internal memory of a microcomputer.

The means for calculating the first transition threshold voltage using stored on-hook and off-hook voltages and known system constants may comprises a microcomputer programmed to calculate the first transition threshold voltage, such that the first transition threshold voltage is greater than the stored line voltage from the off-hook state and less than the expected voltage for the hold stte, according to the equation:

$$V_{TH1} = (V_{OH1} + V_H)/2$$

where, $V_{TH1}$ = first transition threshold voltage;
$V_{OH1}$ = stored line voltage from the off-hook state;
$V_H$ = expected line voltage for hold state;
and, $$V_H = V_{ON}[Z_H/(Z_H + Z_{LOOP})]$$

where, $V_{ON}$ = stored average line voltage for on-hook state;
$Z_H$ = impedance of hold termination;
$Z_{LOOP}$ = calculated impedance of subscriber loop and exchange;
and, $$Z_{LOOP} = (Z_{OH}/V_{OH1})(V_{ON} - V_{OH1})$$

where, $Z_{OH}$=impedance of off-hook termination.

The means for calculating the second transition threshold voltage using stored on-hook and off-hook voltages and known system constants may comprise a microcomputer programmed to calculate the second transition threshold voltage, such that the second transition threshold voltage is greater than the expected line voltage for the hold state and less than the stored line voltage from the on-hook state, according to the equation:

$$V_{TH2}=(V_{ON}+V_H)/2$$

where,
$V_{TH2}$=second transition threshold voltage;
$V_{ON}$=stored average line voltage for on-hook state;
$V_H$=expected line voltage for hold state
and, $$V_H=V_{ON}[Z_H/(Z_H+Z_{LOOP})]$$

where,
$Z_H$=impedance of hold termination;
$Z_{LOOP}$=calculated impedance of subscriber loop and exchange;
and, $$Z_{LOOP}=(Z_{OH}/V_{OH1})(V_{ON}=V_{OH1})$$

where,
$Z_{OH}$=impedance of off-hook termination;
$V_{OH1}$=stored average line voltage from off-hook state.

The means for periodically detecting the line voltage and comparing the line voltage with first and second threshold voltages may be any suitable device such as a bi-stable device as previously described or a series of such devices. In a preferred embodiment of the invention a microcomputer is used to compare the digitized line voltage with the digitized threshold voltages.

The means for placing a telephone line in a hold state by connecting an impedance across a line may be any suitable means such as a solid state switch which introduces the impedance across the line. The solid state switch could be activated solely by internal electronics or in response to activation of a manual switch or button. The hold termination impedance is desirably a linear impedance formed from a resistance, capacitance or inductance, or combinations thereof. The impedance in a given system is desirably constant, (i.e. it does not vary over time), and also essentially resistive.

Similarly, the means for placing a telephone line in an off-hook state by connecting an impedance across a line may comprise any suitable means as previously described with respect to the means for placing a line on hold. The off-hook termination impedance is, however, lower than the hold termination impedance.

The means for indicating the state of a line in response to the comparison of the line voltage with the first and second threshold voltages may comprise any desired sensory signal such as a visual display or an audible tone. The signal may, for example, be one or more visual displays. In a preferred embodiment, a first visual display means is provided for indicating a line is in a off-hook state and a second visual display is provided for indicating a line is in a hold state. Optionally, a single visual display may be provided which is continuously on when a line is in an off-hook state and blinks when the line is in a hold state. The visual displays are desirably light emitting diodes. Such diodes may be continuously forward biased to yield a continuous light and may be periodically forward biased to yield a blinking light.

Desirably, means is provided for detecting and indicating transitions between line states in response to a comparison of the line voltage with the threshold voltages.

The invention further includes multiple hold control circuits as previously described, forming a telephone network, wherein the state of each line is detected by each of said circuits and means is provided for a given circuit to remove the hold impedance from a line when another circuit introduces an off-hook impedance across the line.

At the outset, it should be clearly understood that the drawings are intended to be read together with the specification, and are to be considered a portion of the entire "written description" of this invention, as required by 35 U.S.C. Section 112. Also, like numerals on different drawing figures refer to the same element. It should also be noted at the outset that FIGS. 1, 2A, 2B and 3 depict only the preferred embodiment of the invention and are by no means illustrative of the only way in which the invention may be practiced. For example, FIGS. 2A, 2B depict a circuit comprising two microcomputers, and it is readily seen by one having ordinary skill in the art that these circuit elements may be replaced by discrete elements which perform the same function. So too, amplifier circuits 20–23 in FIGS. 2A, 2B utilize operational amplifiers to periodically detect and amplify the differential line voltage, but this function can also be accomplished by discrete circuit elements. Thus, while FIGS. 1, 2A, 2B and 3 illustrate the preferred embodiment, other embodiments utilizing other circuit elements are contemplated by the claims. The line voltage values used in the description of the drawings are for illustration only. It is to be understood that telephone exchange systems having different voltages can be used and that the impedance and threshold values will be calculated accordingly.

FIGURE 1

Figure 2A:
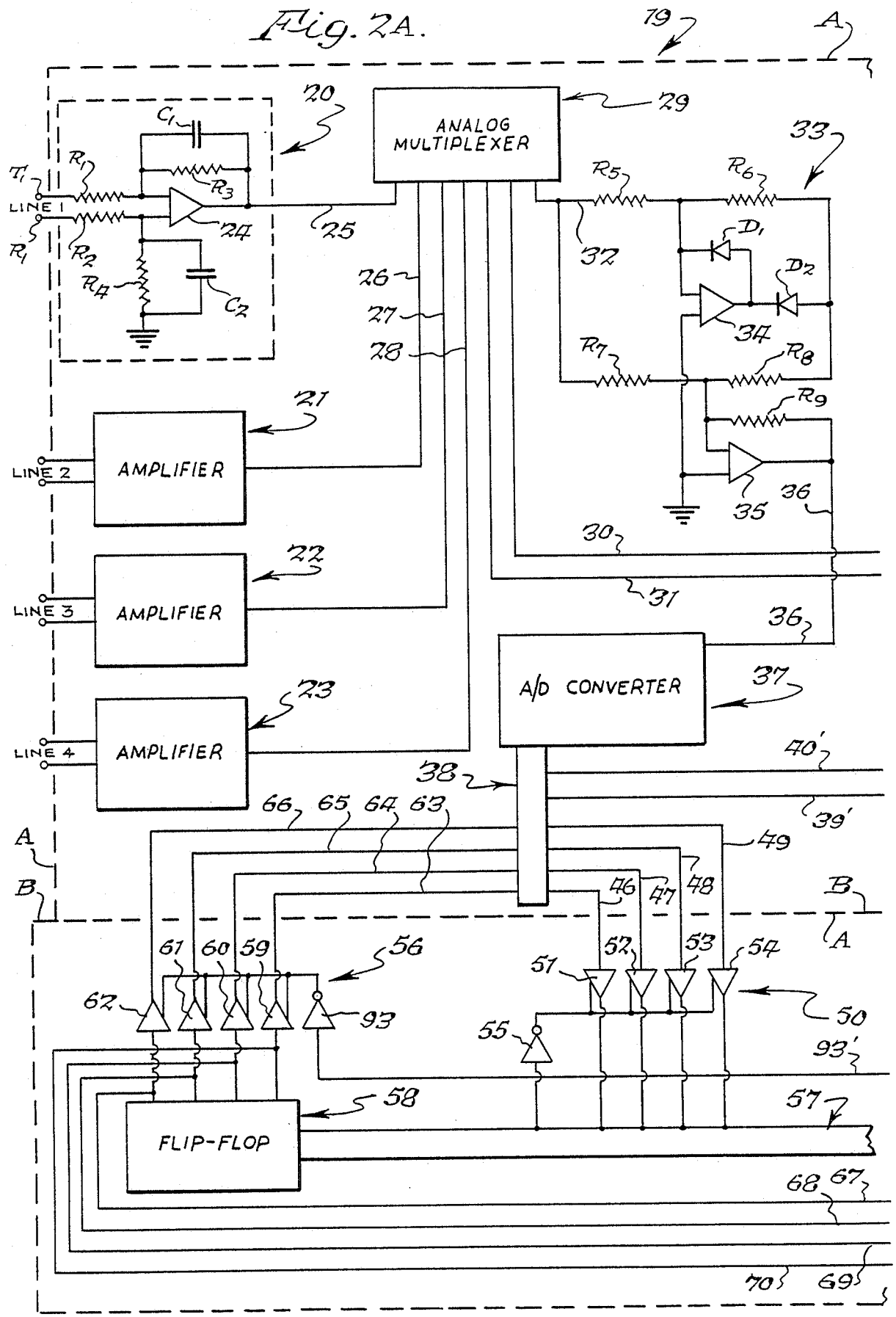
FIGS. 2A and 2B are detailed block and schematic diagrams of the control system shown in FIG. 1 in accordance with one preferred embodiment of the invention.
Figure 2B:
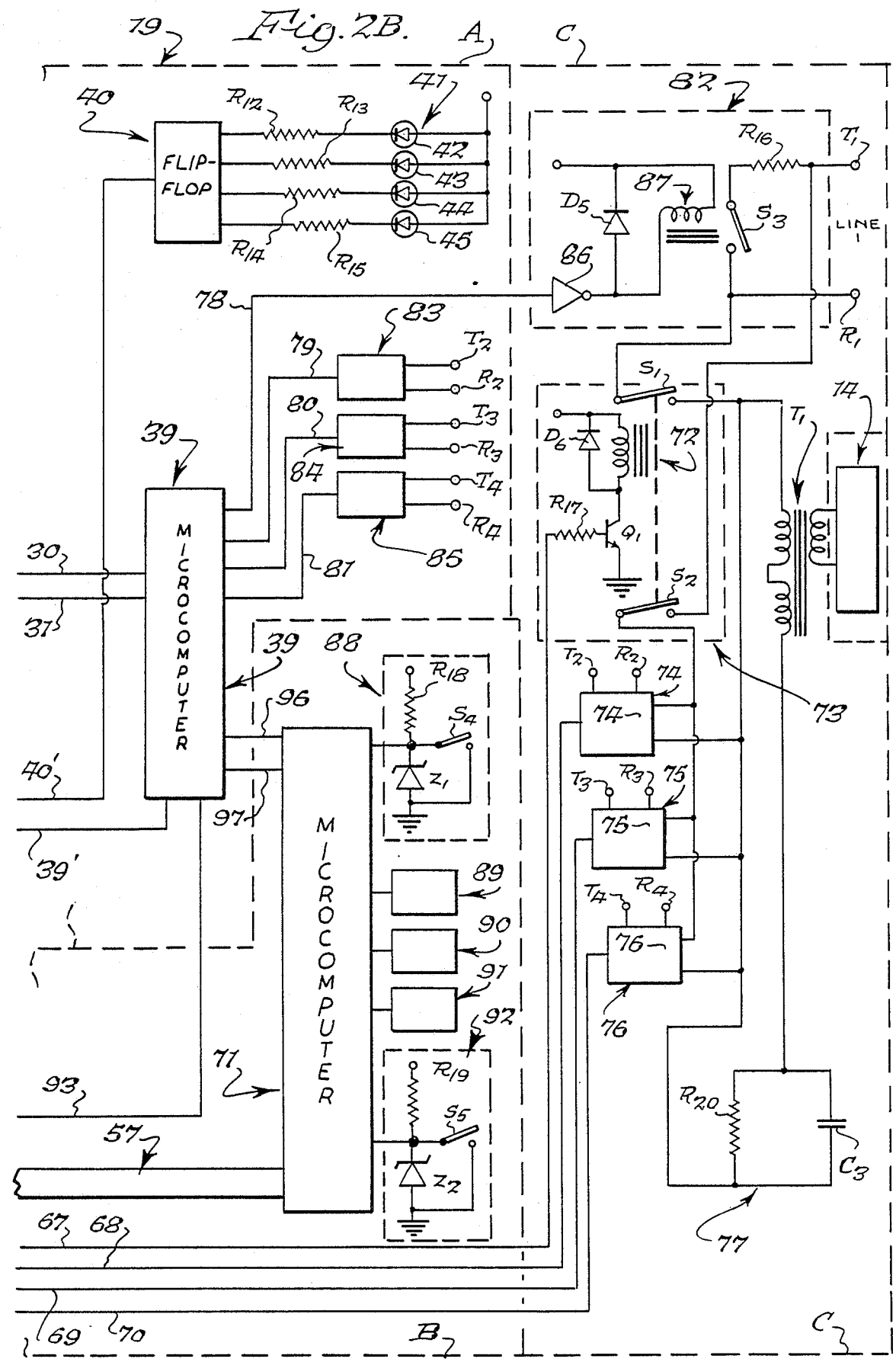

FIG. 1 shows a generalized block diagram of the key telephone system 10 of the invention. The system 10 consists of control processor 11, line monitor 12, line switching and termination network 13, telephone and tone dialing network 14, intercom network 15, voice interface circuit 16, and power supply 17.

Control processor 11 accepts commands from the station keyboard for line or intercom connection, hold, dialing, or other functions, provides outputs to control other circuits within the system, and inputs to receive signals from line monitor 12.

Line voltage 12 monitors the d.c. loop voltage and determines what state each line is in, displays the state information, provides outputs to control the hold termination impedance circuit, and responds to information or signals from control processor 11. Line monitor 12 also controls the intercom network signalling circuits.

Line switching and termination network 13 connects the selected telephone line to the off-hook termination impedance as determined by control processor 11. Network 13 also connects the hold termination impedance to the appropriate telephone line as determined by line monitor 12.

Telephone and tone dialing network 14 provides 2-wire to 4-wire conversion, signal level limitation, and tone dialing functions as provided in a single-line telephone.

Intercom network 15 provides 2-wire to 4-wire conversion and signalling for the inter-station intercom.

Voice interface circuit 16 provides for use of either speakerphone or handset on either telephone line or intercom.

Power supply 17 converts the d.c. supply voltage to suitable voltage levels to power the various system sub-circuits. These voltages are suitable to provide separate power to analog and digital circuits.

FIGS. 2A, 2B

To understand the invention, it is useful to describe the five possible states which exist for a telephone line. Assume system and instrument parameters as follows:

| | |
|---|---|
| $V_{Loop} = 48$ volts | (exchange battery voltage) |
| $Z_{Loop} = 1000$ ohms | (impedance of subscriber loop and exchange) |
| $Z_{OH} = 100$ ohms | (impedance of off-hook termination) |
| $Z_H = 250$ ohms | (impedance of hold termination) |

The five possible states and associated line voltages are:

| State | Line Voltage |
|---|---|
| Dead | $V_{Dead} < 1.3$ volts |
| On-hook | $V_{On} = V_{Loop} = 48$ volts |
| Off-hook$_1$ | $V_{OH1} = V_{LOOP}[Z_{OH}/(Z_{OH} + Z_{LOOP})] = 4.36$ volts |
| Off-hook$_2$ | $V_{OH2} = V_{LOOP}[Z_{OH}/(Z_{OH} + Z_{LOOP})] = 4.36$ volts |
| Hold | $V_H = V_{LOOP}[Z_H/(Z_H + Z_{LOOP})] = 9.59$ volts |

A telephone line is said to be in its "dead" state when line voltage drops below 1.3 volts, or to a level insufficient to operate the telephone. This is the familiar result which occurs when lightning strikes a line or transformer and disrupts service. The telephone line is in its "on-hook" state when the receiver is on the hook and the line voltage is equal to the exchange battery voltage (48 volts). When the receiver is removed from the hook, the line voltage drops abruptly from 48 volts to 4.36 volts, and the line is said to be in its "off-hook" state (the distinction between states "off-hook$_1$" and "off-hook$_2$" will be discussed infra). Finally, when a line is placed on hold, the termination impedance of 250 ohms is placed across the line, the line voltage rises to 9.59 volts, and the line is said to be in the "hold" state.

FIGS. 2A, 2B show a partial detailed block and schematic diagram of the control system shown in FIG. 1 in accordance with one preferred embodiment of the invention. It should be noted that certain aspects of FIG. 1 which are not germane to the present invention have been omitted from FIGS. 2A, 2B. These include the power supply, the intercom network and the voice interface circuit. In addition, certain circuit connections, such as those for the power supply and clock for the microcomputers, have been purposely omitted to simplify FIGS. 2A, 2B. Also, multiple data lines are shown by a block representative of the data bus. It is believed that these modifications, which are readily recognizable by one having ordinary skill in the art, will facilitate understanding of the invention.

Referring now to FIGS. 2A, 2B, key telephone system 19 comprises subcircuits A, B and C. Subcircuit A is representative of line monitor 12; subcircuit B is representative of control processor 11; and subcircuit C is representative of line switching and termination network 13.

Referring to subcircuit A, amplifier circuits 20, 21, 22 and 23 provide means for detecting the line voltage of lines 1-4 respectively. Circuit 20 is shown schematically as a means of detecting the differential d.c. voltage across the tip ($T_1$) and ring ($R_1$) of line 1 whereas circuits 21, 22 and 23 are circuits identical to circuit 20 but depicted in block form and arranged to detect the line voltage of lines 2-4, respectively. Amplifier circuit 20 comprises operational amplifier 24 (National Semiconductor LM324, or equivalent) arranged as a differential amplifier with a gain of 0.033 and an input impedance of 200 Mohm differential and 50 Mohm common-mode. These input impedance levels are required to meet the on-hook impedance limitations of United States F.C.C. Regulation 68.312. Resistpors $R_1$-$R_4$ form the network establishing the gain, input impedance, and common mode rejection ratio. Amplifier circuit 20 is designed to have a common mode rejection ratio of 40 dB. Capacitors $C_1$ and $C_2$ limit the bandwidth of the amplifier to 100 Hz to minimize errors due to transients or electrostatically coupled signals.

Amplifiers 20-23 constantly monitor the d.c. differential voltages of lines 1-4, respectively. The amplifiers function so as to convert this differential input voltage to a proportional ground-referenced analog voltage signal available at the output. The outputs 25, 26, 27, and 28 of these four amplifiers are gated in turn by analog multiplexer 29 (National Semiconductor CD4052B, or equivalent) in response to input signals provided by microcomputer 39 (National Semiconductor 8049, or equivalent) via lines 30 and 31. The output voltages of amplifiers 20-23 are thus sequentially and periodically processed by analog multiplexer 29 in response to signals supplied via lines 30 and 31. The analog output voltage of multiplexer 29, which may be positive or negative depending on line polarity, is applied to absolute value circuit 33 via line 22. Circuit 33 comprises operational amplifiers 34 and 35, resistors $R_5$-$R_9$, and diodes $D_1$ and $D_2$. Circuit 33 functions so as to provide the absolute value of the input signal applied via line 32 at the output via line 36. Thus, the circuit operates properly regardless of the polarity of the input connections at $T_1$—$R_1$, $T_2$—$R_2$, etc. The analog output voltage of absolute value circut 33 is applied to the input of analog-to-digital (A-D) converter 37 (National Semiconductor ADC0805, or equivalent) via line 36. The digital output voltage of A-D converter 37 is transmitted via multiple data lines 39' to microcomputer 39. These data lines are shown schematically as data bus 38. Thus, it is seen that circuit elements 20-23 29, 33 and 37 function together so as to periodically detect each line voltage, convert the line voltage from differential to ground referenced form, determine the absolute value of this voltage, and further convert the analog line voltage to digital signals. Moreover, this detection circuit monitors each line voltage continuously, regardless of whether the line is in the off-hook, on hook, hold, or any other state.

Assuming line 1 is in the on-hook state (i.e., the phone is not in use and the receiver is "on the hook"), subcircuit A will periodically monitor the line voltage. Microcomputer 39, which includes a low pass filter implemented as a digital feedback filter, will compute an average line voltage based on the periodically detected voltages. This average line voltage will be stored in the internal memory of microcomputer 39. If the output of the low pass filter does not change by more than 6.25% of the detected line voltage, and this threshold difference is not exceeded for a predetermined time period (e.g., 15 samples) then the line voltage is said to be stable, and the output of the filter is stored as the new line voltage.

In addition to averaging the detected line voltages and storing the value of the stable line voltage, microcomputer 39 contains circuitry for comparing the detected on-hook line voltages with a predetermined voltage. When the detected on-hook line voltage falls below the predetermined voltage level for a predetermined time period, the microcomputer transmits signals indicating the line has undergone a transition from the on-hook state to the off-hook state. These signals are transmitted to other circuit elements via data bus 38.

Assuming now that line 1 is in the off-hook state (i.e., the phone is in use), subcircuit A continues to periodically monitor the off-hook line voltage. Once again, microcomputer 39 will compute an average off-hook line voltage based on the periodically detected voltages. This average off-hook line voltage is stored in the internal memory of microcomputer 39. If the average off-hook line voltage does not change by more than 6.25% of the detected line voltage, then the off-hook line voltage is said to be stable, and is stored as the new line voltage.

Once a telephone line is in an off-hook state, microcomputer 39 will calculate a first threshold voltage separating off-hook and hold states using the stored on-hook and off-hook voltages and known system constants. This calculation will be accomplished such that the first transition threshold voltage is greater than the stored line voltage from the off-hook state and less than the expected voltage for the hold state, according to the following equation:

$$V_{TH1} = (V_{OH1} + V_H)/2$$

where,
$V_{TH1}$ = first transition threshold voltage;
$V_{OH1}$ = stored line voltage from off-hook state;
$V_H$ = expected line voltage for hold state
and, $$V_H = V_{ON}[Z_H/(Z_H + Z_{LOOP})]$$

where,
$V_{ON}$ = stored average line voltage for on-hook state;
$Z_H$ = impedance of hold termination;
$Z_{LOOP}$ = calculated impedance of subscriber loop and exchange;
and, $$Z_{LOOP} = (Z_{OH}/V_{OH1})(V_{ON} - V_{OH1})$$

where, $Z_{OH}$ = impedance of off-hook termination.

While stilll in the off-hook state, microcomputer 39 will calculate a second threshold voltage separating hold and on-hook states using the stored on-hook and off-hook voltages and known system constants. This calculation will be accomplished such that the second transition threshold voltage is greater than the expected line voltage for the hold state and less than the stored line voltage from the on-hook state, according to the following equation:

$$V_{TH2} = (V_{ON} + V_H)/2$$

where,
$V_{TH2}$ = second transition threshold voltage;
$V_{ON}$ = stored average line voltage for on-hook state;
$V_H$ = expected line voltage for hold state
and, $$V_H = H_{ON}[Z_H/(Z_H + Z_{LOOP})]$$

where,
$Z_H$ = impedance of hold termination;
$Z_{LOOP}$ = calculated impedance of subscriber loop and exchange;
and, $$Z_{LOOP} = (Z_{OH}V_{OH1})(V_{ON} - V_{OH1})$$

where,
$Z_{OH}$ = impedance of off-hook termination;
$V_{OH1}$ = stored average line voltage from off-hook state.

Microcomputer 39 also contains circuitry for comparing the periodically detected line voltage with the first and second threshold voltages. A comparison is made between the line voltage and first threshold voltage to test for a transition from the off-hook state to the hold state, whereas a similar comparison is made between the line voltage and second threshold voltage to test for a transition from the off-hook state to the on-hook state.

Thus it is seen that microcomputer 39 continuously monitors the state of which each telephone line. This state information is communicated to other circuit elements via data bus 38. For example, this data is transmitted via line 40' to type D flip-flop 40 (Texas Instruments 74HC174, or equivalent) for the purpose of indicating the state of each line. In the circuit shown, this indication is provided by light emitting diode (L.E.D.) array 41, which comprises individual line state L.E.D.s 42-45. In the preferred embodiment, an L.E.D. is not illuminated when a line is in the on-hook state, is continuously forward-biased and illuminated to indicate the line is in use (off-hook state), and is made to flash by periodic biasing to indicate a line is on hold.

The state information data provided via data bus 38, which is used to provide visual indication of line state, is also transmitted via data lines 46-49 to data bus 57 for processing by control processor microcomputer 71. The appropriate data is supplied to data bus 57 via tri-state buffer circuit 50 (Texas Instruments 74HC367, or equivalent). Tri-state buffer circuit 50 comprises tri-state buffers 51-54 and inverter 55. Signals from inverter 55 control tri-state buffers 51-54.

Line select switch 88 operates to place line 1 in an off-hook (in use) state, and comprises switch S4, resistor R18, and zenre diode Z1 which protects microcomputer 71 from electrostatic discharge by preventing an overvoltage at the input. Line select switches 89-91 are identical to switch 88 but are shown in block form and operate to place lines 2-4, respectively, in an off-hook state. When one of the line select switches 88-91 is activated, microcomputer 71 sends an appropriate control signal via data bus 57 (which actually comprises multiple data lines) to type D flip-flop 58, which then transmits appropriate control signals via control lines 67-70 to off-hook termination switching circuits 73-76.

Assuming line 1 has been activated, an appropriate signal will turn on $Q_1$, thereby energizing relay 72, closing switches $S_1$ and $S_2$, and placing off-hook termination impedance 77 across line 1. Off-hook termination impedance 77 comprises $C_3$, $R_{20}$, and the coils of $T_1$, and represents a linear impedance value of approximately 100 ohms. Off-hook termination switching circuits 74-76, shown in block form, are identical to off-hook termination switching circuit 73, but serve to connect off-hook termination impedance 77 across lines 2 ($T_2$—$R_2$), 3 ($T_3$—$R_3$), and 4 ($T_4$—$R_4$), respectively. Switching circuits 73-76 may also be operated so as to open switches $S_1$ and $S_2$, thereby disconnecting the off-hook termination impedance from the line, as when a line is placed on hold or in an on-hook state. As described previously, the change in line voltage which occurs when an off-hook termination impedance is placed across a line is sensed by microcomputer 39 via associated circuit elements 20-23, 29, 33 and 37, and the change in state is indicated visually by L.E.D. array 41. In the preferred embodiment depicted in FIGS. 2A, 2B, when line 1 is placed in an off-hook state by line select switch 88, individual line state L.E.D. 42 would also change state from non-illumination to constant illumination. L.E.D.s 43-45 would similary respond to changes in state in lines 2-4, respectively.

Hold select switch 92 operates to place the line in use (for our example, line 1) in a hold state, and comprises switch $S_5$, resistor $R_{19}$, and zener diode $Z_2$. When the hold select switch is activated, microcomputer 71 transmits a signal via request line 96 to microcomputer 39, indicating that the line in use is to be placed on hold. Microcomputer 71 also transmits data via data bus 57, type D flip-flop 58, and tri-state buffers 59-62 via lines 63-66 and data bus 38 to microcomputer 39, indicating which lines are to be placed on hold. Microcomputer 39 responds to the request and data signals by transmitting control signals via inverter 86 to relay 87. When relay 87 is energized, hold termination impedance $R_{16}$ (250 ohms) will be connected across line 1. Thus, it is seen that hold termination circuit 82 comprises inverter 86, diode $D_5$, relay 87, relay switch $S_3$ and hold termination impedance $R_{16}$. Hold termination circuits 83-85, shown in block form, are identical to circuit 82, but serve to connect hold termination impedances across lines 2 ($T_2$—$R_2$), 3 ($T_3$—$R_3$), and 4 ($T_4$—$R_4$), respectively. After a suitable delay, microcomputer 39 sends a signal to microcomputer 71 via acknowledge line 97, acknowledging that a hold termination impedance has been connected and instructing microcomputer 71 to transmit signals to disconnect the appropriate off-hook termination impedance.

CALL PROCESSING SEQUENCE

Figure 3:
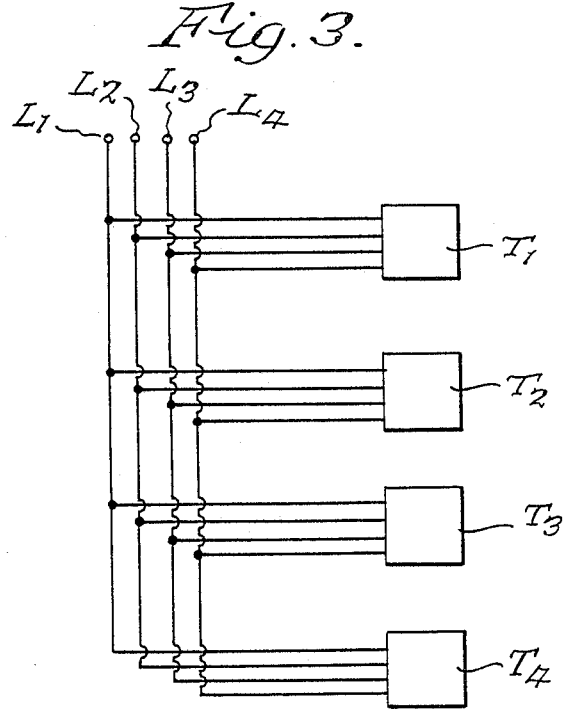
FIG. 3 is a generalized block diagraim of a telephone network which utilizes the key telephone system of the invention.

Refer now to FIG. 3, which depicts a telephone system network consisting of rour telephone stations $T_1$, $T_2$, $T_3$ and $T_4$ and four incoming lines $L_1$, $L_2$, $L_3$ and $L_4$. Each telephone station includes a line state mechanism, which detects and indicates the state of each telephone line. The hold detecting and control circuit is one aspect of the line state mechanism.

When power is first applied to each telephone station, prior to connecting the station to the telephone line, the line state mechanism for each line is reset to its first state, "dead". The only possible path out of this state is to state "on-hook", with the requirement for this transition being that the sampled line voltage be greater than a preset threshold value for a predetermined number of samples. The preset threshold value was chosen as 1.3 volts to ensure reliable operation with subscriber loop exchange impedances as high as 1500 ohms. The debounce delay was chosen as 10 samples to reject noise pulses.

When the telephone station is connected to the idle telephone line, the sampled line voltage will be the exchange battery, or loop voltage. Since this voltage is greater than the 1.3 volt threshold value, the line state mechanism will switch to its second state, "on-hook", after the debounce delay. Upon switching to the "on-hook" state, the line state mechanism begins to compute an average of the loop voltage, using a single pole low pass filter as a digital feedback filter. If the output of this filter does not change by more than 6.25% of the detected line voltage (or 4 counts if this fraction is less than 4 counts), and if the output remains within this range for a minimum period (15 samples), then the output of the filter will be stored as the new loop voltage. For ths system parameters given, this stored value will be 48 volts. This sampling process continues as long as the line state mechanism remains in the "on-hook" state.

Assume a call comes in on $L_1$ and assume further that the call will be received by $T_2$. When the operator removes the handset from the cradle of $T_2$ and connects $L_2$, the line will be connected to $T_2$'s off-hook termination impedance. Using simple voltage division, the line voltage then becomes, $$V_{Line} = V_{OH1} = V_{Loop}[Z_{OH}/(Z_{OH} + Z_{Loop})]$$

which evaluates to 4.36 volts. Since this voltage is below the threshold value of 17 volts for transition from "on-hook" to "off-hook", the line state mechanism begins this transition. At the end of the debounce period for this transition (20 samples), the line state mechanism switches to its third state, "off-hook$_1$", and begins a settling delay of 125 samples to ensure that the line voltage has settled before the average off-hook voltage is stored. Due to the inductive nature of telephone lines, the off-hook voltage may not have settled to the desired level of accuracy (1%) until the end of the settling delay. At the end of the settling delay, an average off-hook voltage is computed using the same filter mechanism described from the "on-hook" state, and the result is stored as the "off-hook$_1$" voltage.

The final event in the "off-hook$_1$" state is calculation of the threshold values for the "hold" state, using the previously stored average line voltages from the "on-hook" and "off-hook$_1$" states and the known termination impedances for "off-hook", $Z_{OH}$, and "hold", $Z_H$. First, the expected voltage for the hold state is computed as follows:

$$V_H = V_{ON}[Z_H[(V_{ON} - V_{OH1})(Z_{OH}/V_{OH}) + Z_H]]$$

which evaluates to 9.59 volts. This value is then used to calculate two threshold voltages. The first, $V_{TH1}$, is the threshold for transitions from "off-hook$_2$" to "hold" or from "hold" to "off-hook$_2$", and is computed as follows:

$$V_{TH1} = (V_{OH1} + V_H)/2$$

which evaluates to 6.97 volts. The second threshold value is $V_{TH2}$, for transitions from "off-hook$_2$" to "on-hook" or from "hold" to "on-hook", and is computed as follows:

$$V_{TH2} = (V_{Loop} + V_H)/2$$

which evaluates to 28.8 volts.

After threshold values $V_{TH1}$ and $V_{TH2}$ are computed and stored, the line state mechanism switches to its fourth state, "off-hook$_2$". At this point, T$_2$'s off-hook termination impedance is still connected to L$_1$. Assume now that the person using T$_2$ wishes to place the call on hold. This is accomplished by depressing T$_2$'s hold select switch, which activates circuitry which connects T$_2$'s hold termination impedance across L$_1$, and disconnects T$_2$'s off-hook termination impedance from L$_1$. The line voltage across L$_1$ is now 9.59 volts, which is the hold voltage $V_H$ as previously calculated. Since $V_H$ is higher than the threshold voltage $V_{TH1}$, the line state mechanisms of all four stations will begin the transition from state "off-hook$_2$" to "hold". This transition will be completed if $V_H$ is greater than $V_{TH1}$ for a minimum debounce period of 5 samples.

In placing L$_1$ on hold, T$_2$ used its hold control circuit, which is activated by external signals and information from T$_2$'s line state mechanism. The hold control circuit is initially in an inactive state. An external signal causes the hold control circuit to switch from this first inactive state to a second state, which disconnects fthe off-hook termination impedance from L$_1$ and connects the hold termination impedance to L$_1$. After a delay of 10 samples, the hold contrl circuit switches to a third state, in which the hold termination impedance remains connected to L$_1$ and the hold control circuit is capable of responding to the state of the line stae mechanism. As long as the line state mechanism remains in its fifth state, "hold", the hold control circuit will remain in its third state.

Assume, now, that someone decides to speak to the party on hold. Suppose, also, that this person uses T$_3$ to speak to the party on hold. By removing the handset from T$_3$ and depressing the L$_1$ select switch, T$_3$'s off-hook termination impedance will be connected to L$_1$. The line, L$_1$, will then be terminated by both the hold termination impedance of T$_2$ and the off-hook termination impedance of T$_3$. The line voltage will then be:

$$V_{Line} = V_{Loop} Z_{Comb}/(Z_{Comb} + Z_{Loop})$$

where $$Z_{Comb} = Z_{OH} Z_H/(Z_{OH} + Z_H)$$

Since $V_{Line}$ evaluates to 3.2 bolts, which is lower than $V_{TH1}$, the line state mechanisms of all four telephone stations will begin a transition from "hold" to "off-hook$_2$". After a debounce delay of 5 samples, the line state mechanisms will switch to "off-hook$_2$".

The effect of this transition will vary among the four telephone stations. For T$_1$, T$_3$ and T$_4$, the only effect will be a change of the visual indication for L$_1$ from "hold" to "off-hook". At T$_2$, however, the hold control circuit is in the third state, which is responsive to the line state mechanism. When the line state mechanism switches from "hold" to "off-hook$_2$", the hold control circuit switches to its first state, disconnecting T$_2$'s hold termination impedance from L$_1$. When this series of events is completed, only T$_3$'s off-hook termination impedance is connected to L$_1$.

The final event which will occur in a phone call is termination of the call. This can follow either of the following sequences, depending on whether the call is terminated locally or by the distant party.

If the call is terminated locally, the off-hook termination of the instrument using the line will be disconnected from the line, causing $V_{Line}$ to change from $V_{OH}$ to $V_{Loop}$. Since this will be greater than $V_{TH2}$, the line state mechanisms of all instruments connected to the line will switch to the state, "on-hook", after a debounce delay.

If the call is terminated by the distant part, this will be indicated by the local exchange by switching $V_{Loop}$ from 48 volts to 0 volts for approximately 600 msec. Whether the line is "off-hook" or on "hold", the line state mechanisms of all instruments connected to the line will switch to the first state, "dead", after a debounce delay of 400 msec. If the line is on "hold", the change in state of the line state mechanism will cause the active hold control mechanism to switch from its third state to its inactive first state, disconnecting the hold termination impedance from the line. After the termination impedance (either off-hook or hold) is disconnected from the line, the line voltage will change to $V_{Loop}$, which will return to 48 V at the end of the 600 msec period, causing the line state mechanisms to switch to the second state, "on-hook", after a debounce delay.

What is claimed is:

1. A hold detecting circuit for a key telephone system, for determining a telephone line state of on-hook, hold, or off-hook, comprising:
   means for periodidally detecting a line voltage to obtain a detected line voltage;
   means for determining a representative stable on-hook line voltage using detected voltge obtained when the telephone line is in an on-hook state;
   means for storing the value of said stable on-hook line voltage;
   means for determining a representative stable off-hook line voltage using detected voltage obtained when the telephone line is in an off-hook state;
   means for storing the value of said stable off-hook line voltage;
   means for calculating a first transition threshold voltage separating off-hook and hold line states using the stored stable on-hook and stable off-hook voltages and known system constants;
   means for calculating a second transition threshold voltage separating hold and on-hook line states using the stored stable on-hook and stable off-hook voltages and known system constants; and
   means for comparing said detected line voltage with said first and second threshold voltages to determine off-hook, on-hook and hold line states.

2. A hold detecting circuit for a key telephone system as described in claim 1 wherein said means for periodically detecting line voltage comprises:
   means for amplifying a differential line voltage;
   means for converting said differential voltage to a proportional ground referenced analog voltage signal;
   means for converting said analog voltage signal to digital form;
   means for initiating said analog-to-digital conversion at specified points in time.

3. A hold control circuit for a key telephone system comprising the detecting circuit of claim 1, and further comprising:
   means for placing said telephone line in a hold state by connecting an impedance across said line in response to a signal.

4. A hold control circuit for a key telephone system as described in claim 3 wherein said signal is provided by a microcomputer in response to activation of a manually activated switch.

5. A hold control circuit for a key telephone system as described in claim 3 wherein said impedance is provided by a linear circuit element.

6. A hold control circuit for a key telephone system as described in claim 3 wherein said impedance is constant.

7. A hold control circuit for a key telephone system as described in claim 3 wherein said impedance is primarily resistive.

8. A hold control circuit for a key telephone system as described in claim 3 wherein said impedance is provided by a circuit containing a zener diode.

9. A telephone network comprising a plurality of telephone stations each of which includes a hold control circuit as described in claim 3.

10. The telephone network of claim 9 wherein line state is detected by each of said control circuits and means is provided to remove an inserted hold impedance from across a line when another control circuit introduces an off-hook impedance across a line.

11. A hold control circuit for a key telephone system comprising the detecting circuit of claim 1, and further comprising:
means for placing said telephone line in an off-hook state by connecting an impedance across said line in response to a signal.

12. A hold control circuit for a key telephone system as described in claim 11 wherein said signal is provided by a microcomputer in response to activation of a manually activated switch.

13. A hold control circuit for a key telephone system as described in claim 11 wherein said impedance is provided by a linear circuit element.

14. A hold control circuit for a key telephone system as described in claim 11 wherein said impedance is constant.

15. A hold control circuit for a key telephone system comprising the detecting circuit of claim 1 and further comprising:
means for indicating the state of said line in response to the comparison of said detected line voltage with said first and second threshold voltages.

16. A hold control circuit for a key telephone system as described in claim 15 wherein said means for indicating the state of said line in response to the comparison of said detected line voltage with said first and second threshold voltages further comprises:
first visual display means for indicating a line is in an off-hook state;
second visual display means for indicating a line is in a hold state.

17. A hold control circuit for a key telephone system as described in claim 16 wherein said first visual display means comprises a light emitting diode which is continuously forward biased to indicate said off-hook state.

18. A hold control circuit for a key telephone system as described in claim 16 wherein said second visual display means comprises a light emitting diode which is periodically forward biased to indicate said hold state.

19. A hold control circuit for a key telephone system as described in claim 15 and further comprising:
means for detecting and indicating transitions between said off-hook and hold states in response to the comparison of said detected line voltage and said first threshold voltage.

20. A hold control circuit for a key telephone system as described in claim 15 and further comprising:
means for detecting and indicating transitions between said off-hook and on-hook states in response to the comparison of said detected line voltage and said second threshold voltage.

21. A hold detecting circuit for a key telephone system as described in claim 1 wherein said means for determining a representative stable on-hook line voltage using said detected line voltage comprises:
a microcomputer operatively arranged to continuously sample and average said detected line voltage obtained when the telephone line is in the on-hook state.

22. A hold detecting circuit for a key telephone system as described in claim 1 wherein said means for storing the value of said stable on-hook line voltage comprises:
a microcomputer operatively arranged to store the value of said stable on-hook line voltage within its internal memory.

23. A hold detecting circuit for a key telephone system as described in claim 1 wherein said means for determining a respresentative stable off-hook line voltage using said detected line voltage comprises:
a microcomputer operatively arranged to continuously sample and average said detected line voltage obtained when the telephone line is in the off-hook state.

24. A hold detecting circuit for a key telephone system as described in claim 1 wherein said means for storing the value of said stable off-hook line voltage comprises:
a microcomputer operatively arranged to store the value of said stable off-hook line voltage in its internal memory.

25. A hold detecting circuit for a key telephone system as described in claim 1 wherein said means for calculating a first transmission threshold voltage using the stored on-hook and off-hook voltages and known system constants comprises:
means to calculate said first transition threshold voltage such that said first transition threshold voltage is greater than the stored line voltage from the off-hook state and is less than an expected line voltage for the hold state;
means to calculate the expected line voltage for the hold state from the stored on-hook and off-hook voltages, and known system constants.

26. A hold detecting circuit for a key telephone system as described in claim 25 wherein said means to calculate said first transition threshold voltage comprises:
a microcomputer operatively arranged to calculate said first transition threshold voltage according to the equation:

$$V_{TH1} = (V_{OH1} + V_H)/2$$

where,
$V_{TH1}$ = first transition threshold voltage;
$V_{OH1}$ = stored average line voltage from off-hook state;
$V_H$ = expected line voltage for hold state, which is calculated from the stored on-hook and off-hook voltages, and known system constants.

27. A hold detecting circuit for a key telephone system as described in claim 25 wherein said means to calculate the expected line voltage for the hold state comprises:
means to calculate the expected line voltage for the hold state from the stored on-hook voltage, the known hold state termination impedance, and a calculated impedance of subscriber loop and exchange;
means to calculate the impdedance of subscriber loop and exchange from the stored on-hook voltage, the stored off-hook voltage, and the known off-hook state termination impedance.

28. A hold detecting circuit for a key telephone system as described in claim 27 wherein said means to calculate the expected line voltage for the hold state from the stored on-hook voltage, the known hold state termination impedance, and the calculated impedance of subscriber loop and exchange comprises:
a microcomputer operatively arranged to calculate said expected line voltage for the hold state according to the equation:

$$V_H = V_{ON}[Z_H/(Z_H + Z_{LOOP})]$$

where,
$V_H$ = expected line voltage for the hold state;
$V_{ON}$ = stored average line voltage for on-hook state;
$Z_H$ = impedance of hold termination;
$Z_{LOOP}$ = impedance of subscriber loop and exchange, calculated from the stored on-hook voltage, the stored off-hook voltage, and the known off-hook state termination impedance.

29. A hold detecting circuit for a key telephone system as described in claim 27 wherein said means to calculate the impedance of subscriber loop and exchange from the stored on-hook voltage, the stored off-hook voltage, and the known off-hook state termination impedance comprises:
a microcomputer operatively arranged to calculate said impedance of subscriber loop and exchange according to the equation:

$$Z_{LOOP} = (Z_{OH}/V_{OH1})(V_{ON} - V_{OH1})$$

where,
$Z_{LOOP}$ = calculated impedance of subscriber loop and exchange;
$Z_{OH}$ = impedance of off-hook termination;
$V_{OH1}$ = stored average line voltage from off-hook state;
$V_{ON}$ = stored average line voltage for on-hook state.

30. A hold detecting circuit for a key telephone system as described in claim 1 wherein said means for calculating a second transistion threshold voltage using the stored on-hook and off-hook voltages and known system constants comprises:
means to calculate said second transition threshold voltage such that said second transition threshold voltage is greater than an expected line voltage for the hold state and is less than the stored line voltage from the on-hook state;
means to calculate the expected line voltage for the hold state from the stored on-hook and off-hook voltages, and known system constants.

31. A hold detecting circuit for a key telephone system as described in claim 30 wherein said means to calculate said second transition threshold voltage comprises:
a microcomputer operatively arranged to calculate said second transition threshold voltage according to the equation:

$$V_{TH2} = (V_{ON} + V_H)/2$$

where,
$V_{TH2}$ = second transition threshold voltage;
$V_{ON}$ = stored average line voltage for on-hook state;
$V_H$ = expected line voltage for hold state, which is calculated from the stored on-hook and off-hook voltages and known system constants.

32. A hold detecting circuit for a key telephone system as described in claim 30 wherein said means to calculate the expected line voltage for the hold state comprises:
means to calculate the expected line voltage for the hold state from the stored on-hook voltage, the known hold state termination impedance, and a calculated impedance of subscriber loop and exchange;
means to calculate the impedance of subscriber loop and exchange from the stored on-hook voltage, the stored off-hook voltage, and the known off-hook state termination impedance.

33. A hold detecting circuit for a key telephone system as described in claim 32 wherein said means to calculate the expected line voltage for the hold state from the stored on-hook voltage, the known hold state termination impedance, and the calculated impedance of subscriber loop and exchange comprises:
a microcomputer operatively arranged to calculate said expected line voltage for the hold state according to the equation:

$$V_H = V_{ON}[Z_H/(Z_H + Z_{LOOP})]$$

where,
$V_H$ = expected line voltage for the hold state;
$V_{ON}$ = stored average line voltage for on-hook state;
$Z_H$ = impedance on hold termination;
$Z_{LOOP}$ = impedance of subscriber loop and exchange, calculated from the stored on-hook voltage, the stored off-hook voltage, and the known off-hook state termination impedance.

34. A hold detecting circuit for a key telephone system as described in claim 32 wherein said means to calculate the impedance of subscriber loop and exchange from the stored on-hook voltage, the stored off-hook voltage, and the known off-hook state termination impedance comprises:
a microcomputer operatively arranged to calculate said impedance of subscriber loop and exchange according to the equation:

$$Z_{LOOP} = (Z_{OH}/V_{OH1})(V_{ON} - V_{OH1})$$

where,
$Z_{LOOP}$ = calculated impedance of subscriber loop and exchange;
$Z_{OH}$ = impedance of off-hook termination;
$V_{OH1}$ = stored average line voltage from off-hook state;
$V_{ON}$ = stored average line voltage for on-hook state.

35. A hold detecting circuit for a key telephone system as described in claim 1 wherein said means for comparing said detected line voltage with said first and second threshold voltages comprises:
a microcomputer operatively arranged to compare said detected line voltage with said first and second threshold voltages.

36. A hold detecting method for a key telephone system, for determining a telephone line state of on-hook, hold, or off-hook, comprising:
periodically detecting a line voltage to obtain a detected line voltage;
determining a representative stable on-hook line voltage using detected voltage obtained when the telephone line is in an on-hook state;
storing the value of said stable on-hook line voltage;
determining a representative stable off-hook line voltage using detected voltage obtained when the telephone line is in an off-hook state;
storing the value of said stable off-hook line voltage;
calculating a first transition threshold voltage separating off-hook and hold line states using the stored stable on-hook and stable off-hook voltages and known system constants;
calculating a second transition threshold voltage separating hold and on-hook line states using the stored stable on-hook and stable off-hook voltages and known system constants; and
comparing said detected line voltage with said first and second threshold voltages to determine off-hook, on-hook and hold line states.

37. A hold detecting method for a key telephone system as described in claim 36 wherein said method of periodically detecting line voltage comprises:
amplifying a differential line voltage;
converting said differential voltage to a proportional ground referenced analog voltage signal;
converting said analog voltage signal to digital form;
initiating said analog to digital conversion at specified points in time.

38. A hold control method for a key telephone system comprising the detecting method of claim 36, and further comprising:
placing said telephone line in a hold state by connecting an impedance across said line in response to a signal.

39. A hold control method for a key telephone system as described in claim 38 wherein said signal is provided by a microcomputer in response to activation of a manually activated switch.

40. A hold control method for a key telephone system as described in claim 38 wherein said impedance is provided by a linear circuit element.

41. A hold control method for a key telephone system as described in claim 38 wherein said impedance is constant.

42. A hold control method for a key telephone system as described in claim 38 wherein said impedance is primarily resistive.

43. A hold control method for a key telephone system as described in claim 38 wherein said impedance is provided by a circuit containing a zener diode.

44. A hold control method for a key telephone system comprising the detecting method of claim 36, and further comprising:
placing said telephone line in an off-hook state by connecting an impedance across said line in response to a signal.

45. A hold control method for a key telephone system as described in claim 44 wherein said signal is provided by a microcomputer in response to activation of a manually activated switch.

46. A hold control method for a key telephone system as described in claim 44 wherein said impedance is provided by a linear circuit element.

47. A hold control method for a key telephone system as described in claim 44 wherein said impedance is constant.

48. A hold control method for a key telephone system comprising the detecting method of claim 36 and further comprising:
indicating the state of said line in response to the comparison of said detected line voltage with said first and second threshold voltages.

49. A hold control method for a key telephone system as described in claim 48 and further comprising:
detecting and indicating transitions between said off-hook and hold states in response to the comparison of said detected line voltage and said first threshold voltage.

50. A hold control method for a key telephone system as described in claim 48 and further comprising:
detecting and indicating transitions between said off-hook and on-hook states in response to the comparison of said detected line voltage and said second threshold voltage.

51. A hold detecting method for a key telephone system as described in claim 36 wherein said method of determining a representative stable on-hook line voltage using said detected line voltage comprises:
using a microcomputer to continuously sample and average said line voltage obtained when the telephone line is in the on-hook state.

52. A hold detecting method for a key telephone system as described in claim 36 wherein said method of storing the value of said stable on-hook line voltage comprises:
using a microcomputer to store the value of said stable on-hook line voltage.

53. A hold detecting method for a key telephone system as described in claim 36 wherein said method of determining a representative stable off-hook line voltage using said detected line voltage comprises:
using a microcomputer to continuously sample and average said detected line voltage obtained when the telephone line is in the off-hook state.

54. A hold detecting method for a key telephone system as described in claim 30 wherein said method of storing the value of said stable off-hook line voltage comprises:
using a microcomputer to store the value of said stable off-hook line voltage.

55. A hold detecting method for a key telephone system as described in claim 36 wherein said method of calculating a first transition threshold voltage using the stored on-hook and off-hook voltages and known system constants comprises:
calculating said first transition threshold voltage such that said first transition threshold voltage is greater than the stored line voltage from the off-hook state and is less than an expected line voltage for the hold state;
calculating the expected line voltage for the hold state from the stored on-hook and off-hook voltages, and known system constants.

56. A hold detecting method for a key telephone system as described in claim 55 wherein said calculation of said first transition threshold voltage comprises:

using a microcomputer operatively arranged to calculate said first transition threshold voltage according to the equation:

$$V_{TH1}=(V_{OH1}+V_H)/2$$

where, $V_{TH1}$ = first transition threshold voltage;
$V_{OH1}$ = stored average line voltage from off-hook state;
$V_H$ = expected line voltage for hold state, which is calculated from the stored on-hook and off-hook voltages, and known system constants.

57. A hold detecting method for a key telephone system as described in claim 55 wherein said calculation of the expected line voltage for the hold state comprises:
calculating the expected line voltage for the hold state from the stored on-hook voltage, the known hold state termination impedance, and a calculated impedance of subscriber loop and exchange;
calculating the impedance of subscriber loop and exchange from the stored on-hook voltage, the stored off-hook voltage, and the known off-hook state termination impedance.

58. A hold detecting method for a key telephone system as described in claim 57 wherein said calculation of the expected line voltage for the hold state from the stored on-hook voltage, the known hold state termination impedance, and the calculated impedance of subscriber loop and exchange comprises:
using a microcomputer operatively arranged to calculate said expected line voltage for the hold state according to the equation:

$$V_H = V_{ON}[Z_H/(Z_H+Z_{LOOP})]$$

where, $V_H$ = expected line voltage for the hold state;
$V_{ON}$ = stored average line voltage for on-hook state;
$Z_H$ = impedance of hold termination;
$Z_{LOOP}$ = impedance of subscriber loop and exchange, calculated from the stored on-hook voltage, the stored off-hook voltage, and the known off-hook state termination impedance.

59. A hold detecting method for a key telephone system as described in claim 57 wherein said calculation of the impedance of subscriber loop and exchange from the stored on-hook voltage, the stored off-hook voltage, and the known off-hook state termination impedance comprises:
using a microcomputer operatively arranged to calculate said impedance of subscriber loop and exchange according to the equation:

$$Z_{LOOP}=(Z_{OH}/V_{OH1})(V_{ON}-V_{OH1})$$

where, $Z_{LOOP}$ = calculated impedance of subscriber loop and exchange;
$Z_{OH}$ = impedance of off-hook termination;
$V_{OH1}$ = stored average line voltage from off-hook state;
$V_{ON}$ = stored average line voltage for on-hook state.

60. A hold detecting method for a key telephone system as described in claim 36 wherein said calculation of a second transition threshold voltage using the stored on-hook and off-hook voltages and known system contants comprises:
calculating said second transition threshold voltage such that said second transition threshold voltage is greater than an expected line voltage for the hold state and is less than the stored line voltage from the on-hook state;
calculating the expected line voltage for the hold state from the stored on-hook and off-hook voltages, and known system constants.

61. A hold detecting method for a key telephone system as described in claim 60 wherein said calculation of said second transition threshold voltage comprises:
using a microcomputer operatively arranged to calculate said second transition threshold voltage according to the equation:

$$V_{TH2}=(V_{ON}+V_H)/2$$

where, $V_{TH2}$ = second transition threshold voltage;
$V_{ON}$ = stored average line voltage for on-hook state;
$V_H$ = expected line voltage for hold state, which is calculated from the stored on-hook and off-hook voltages and known system constants.

62. A hold detecting method for a key telephone system as described in claim 60 wherein said calculation of the expected line voltage for the hold state comprises:
calculating the expected line voltage for the hold state from the stored on-hook voltage, the known hold state termination impedance, and a calculated impedance of subscriber loop and exchange;
calculating the impedance of subscriber loop and exchange from the stored on-hook voltage, the stored off-hook voltage, and the known off-hook state termination impedance.

63. A hold detecting method for a key telephone system as described in claim 62 wherein said calculation of the expected line voltage for the hold state from the stored on-hook voltage, the known hold state termination impedance, and the calculated impedance of subscriber loop and exchange comprises:
using a microcomputer operatively arranged to calculate said expected line voltage for the hold state according to the equation:

$$V_H = V_{ON}[Z_H/(Z_H+Z_{LOOP})]$$

where, $V_H$ = expected line voltage for the hold state;
$V_{ON}$ = stored average line voltage for on-hook state;
$Z_H$ = impedance of hold termination;
$Z_{LOOP}$ = impedance of subscriber loop and exchange, calculated from the stored on-hook voltage, the stored off-hook voltage, and the known off-hook state termination impedance.

64. A hold detecting method for a key telephone system as described in claim 62 wherein said calculation of the impedance of subscriber loop and exchange from the stored on-hook voltage, the stored off-hook voltage, and the known off-hook state termination impedance comprises:
using a microcomputer operatively arranged to calculate said impedance of subscriber loop and exchange according to the equation:

$$Z_{LOOP}=(Z_{OH}/V_{OH1})(V_{ON}-V_{OH1})$$

where, $Z_{LOOP}$ = calculated impedance of subscriber loop and exchange;
$Z_{OH}$ = impedance of off-hook termination;
$V_{OH1}$ = stored average line voltage from off-hook state;
$V_{ON}$ = stored average line voltage for on-hook state.

65. A hold detecting method for a key telephone system as described in claim 36 wherein said method of comparing said detected line voltage with said first and second threshold voltages comprises:

using a microcomputer to compare said detected line voltage with said first and second threshold voltages.

* * * * *

UNITED STATES PATENT AND TRADEMARK OFFICE
CERTIFICATE OF CORRECTION

PATENT NO. : 4,803,718

DATED : February 7, 1989

INVENTOR(S) : James E. Neil et al.

It is certified that error appears in the above-identified patent and that said Letters Patent is hereby corrected as shown below:

| COLS. | LINES | | |
|---|---|---|---|
| 1 | 32 | "fluctating" to read | -- fluctuating -- |
| 1 | 56 | "zener diode" " " | -- zener diodes -- |
| 1 | 64 | "system" " " | -- systems -- |
| 2 | 3 | "hold circuit circuit" | -- hold control circuit -- |
| 2 | 18 | "predetermied" " " | -- predetermined -- |
| 3 | 6 | "battey" " " | -- battery -- |
| 3 | 23 | "diagraim" " " | -- diagram -- |
| 3 | 37 | "forms" " " | -- form -- |
| 3 | 39 | "lie" " " | -- line -- |
| 4 | 37 | "voltaage" " " | -- voltage -- |
| 4 | 41 | "comprises" " " | -- comprise -- |
| 5 | 27 | "$Z_{LOOP}=(Z_{OH}/V_{OH1};1)$ $(V_{ON}=V_{OH1})$" | -- $Z_{LOOP}=(Z_{OH}/V_{OH1})$ -- $(V_{ON}-V_{OH1})$ -- |
| 6 | 55 | "line voltage 12" | -- line monitor 12 -- |
| 8 | 17 | "Resistpors" " " | -- Resistors -- |
| 8 | 40 | "line 22" " " | -- line 32 -- |
| 8 | 47 | "circut 33" " " | -- circuit 33 -- |
| 8 | 53 | "20-23 29, 33 and 37" | -- 20-23, 29, 33 and 37 -- |
| 10 | 9 | "$V_H=H_{ON}[Z_H/(Z_H+Z_{LOOP})]$" | -- $V_H=V_{ON}[Z_H/(Z_H+Z_{LOOP})]$ -- |

UNITED STATES PATENT AND TRADEMARK OFFICE
CERTIFICATE OF CORRECTION

PATENT NO. : 4,803,718

DATED : February 7, 1989

INVENTOR(S) : James E. Neil et al.

It is certified that error appears in the above-identified patent and that said Letters Patent is hereby corrected as shown below:

| COLS. | LINES | | to read | |
|---|---|---|---|---|
| 10 | 17 | "$Z_{LOOP}=(Z_{OH}\ V_{OH1})(V_{ON}-V_{OH1})$" | -- | $Z_{LOOP}=(Z_{OH}/V_{OH1})(V_{ON}-V_{OH1})$ -- |
| 10 | 56 | "Zenre" | " " | -- Zener -- |
| 11 | 54 | "rour" | " " | -- four -- |
| 12 | 18 | "ths" | " " | -- the -- |
| 12 | 53 | "$V_H=V_{ON}[Z_H[(V_{ON}-V_{OH1})(Z_{OH}/V_{OH})+Z_H]]$" | -- | $V_H=V_{ON}[Z_H/[(V_{ON}-V_{OH1})(Z_{OH}/V_{OH})+Z_H]]$ -- |
| 13 | 24 | "ths" | " " | -- the -- |
| 13 | 27 | "contrl" | " " | -- control -- |
| 13 | 30 | "stae" | " " | -- state -- |
| 13 | 49 | "*evaluates*" | " " | -- evaluates -- |
| 13 | 49 | "bolts" | " " | -- volts -- |
| 14 | 8 | "part" | " " | -- party -- |
| 14 | 29 | "periodidally" | " " | -- periodically -- |
| 14 | 32 | "voltge" | " " | -- voltage -- |

UNITED STATES PATENT AND TRADEMARK OFFICE
CERTIFICATE OF CORRECTION

PATENT NO. : 4,803,718

DATED : February 7, 1989

INVENTOR(S) : James E. Neil et al.

It is certified that error appears in the above-identified patent and that said Letters Patent is hereby corrected as shown below:

| COLS. | LINES | | to read | |
|---|---|---|---|---|
| 16 | 41 | "transmission" | " " | -- transition -- |
| 17 | 10 | "impdedance" | " " | -- impedance -- |
| 18 | 43 | "on " | " " | -- of -- |
| 20 | 48 | "30" | " " | -- 36 -- |
| 21 | 59 | "calculated impedance of subscriber loop and exchange" | " " | -- calculated impedance of subscriber loop and exchange -- |

Signed and Sealed this

Twenty-sixth Day of September, 1989

Attest:

DONALD J. QUIGG

Attesting Officer

Commissioner of Patents and Trademarks